US012643049B2

(12) United States Patent
McCoy et al.

(10) Patent No.: US 12,643,049 B2
(45) Date of Patent: Jun. 2, 2026

(54) BLOCKCHAIN GAMING SYSTEM

(71) Applicant: Sony Interactive Entertainment LLC, San Mateo, CA (US)

(72) Inventors: Charles McCoy, San Mateo, CA (US); True Xiong, San Mateo, CA (US); Nathan Blaine Morgan, San Mateo, CA (US); Christopher McEniry, San Mateo, CA (US)

(73) Assignee: Sony Interactive Entertainment LLC

( * ) Notice: Subject to any disclaimer, the term of this patent is extended or adjusted under 35 U.S.C. 154(b) by 225 days.

(21) Appl. No.: 17/938,001

(22) Filed: Oct. 4, 2022

(65) Prior Publication Data

US 2023/0022301 A1     Jan. 26, 2023

Related U.S. Application Data

(60) Continuation of application No. 16/711,350, filed on Dec. 11, 2019, now Pat. No. 11,458,402, which is a division of application No. 15/793,600, filed on Oct. 25, 2017, now Pat. No. 10,549,202.

(51) Int. Cl.
| | |
|---|---|
| *A63F 13/00* | (2014.01) |
| *A63F 13/73* | (2014.01) |
| *A63F 13/792* | (2014.01) |
| *A63F 13/85* | (2014.01) |
| *H04L 9/06* | (2006.01) |
| *A63F 13/77* | (2014.01) |

(52) U.S. Cl.
CPC ............ *A63F 13/73* (2014.09); *A63F 13/792* (2014.09); *A63F 13/85* (2014.09); *H04L 9/0643* (2013.01); *A63F 13/77* (2014.09);

*A63F 2300/401* (2013.01); *A63F 2300/5526* (2013.01); *A63F 2300/575* (2013.01)

(58) Field of Classification Search
None
See application file for complete search history.

(56) References Cited

U.S. PATENT DOCUMENTS

| | | | | |
|---|---|---|---|---|
| 3,573,751 | A | 4/1971 | Delisle | |
| 5,915,019 | A * | 6/1999 | Ginter ..................... | H04L 63/16 |
| | | | | 705/26.1 |
| 6,061,449 | A * | 5/2000 | Candelore .............. | G06F 21/14 |
| | | | | 713/168 |
| 6,341,353 | B1 | 1/2002 | Herman et al. | |
| 6,367,013 | B1 * | 4/2002 | Bisbee ................... | H04L 63/12 |
| | | | | 713/176 |
| 8,042,149 | B2 * | 10/2011 | Judge .................... | G06F 21/554 |
| | | | | 726/13 |
| 9,529,923 | B1 * | 12/2016 | Baird, III .............. | G06F 16/275 |
| 9,635,000 | B1 | 4/2017 | Muftic | |

(Continued)

FOREIGN PATENT DOCUMENTS

| | | | | | |
|---|---|---|---|---|---|
| CA | 2253481 | C | * | 2/2007 | ......... A63F 3/00075 |
| CA | 2935813 | A1 | * | 7/2014 | ............. G16H 20/70 |

*Primary Examiner* — Paul A D'Agostino

(74) *Attorney, Agent, or Firm* — Kilpatrick Townsend & Stockton LLP

(57) ABSTRACT

A block chain system allows mining for new valid values in a system such as a computer game or computer-based trading card system. Instead of each new value being added to the block chain being equivalent, each new value is one of a plurality of possible choices.

19 Claims, 4 Drawing Sheets

(56) References Cited

U.S. PATENT DOCUMENTS

| | | | |
|---|---|---|---|
| 2003/0046244 A1* | 3/2003 | Shear | G06F 16/285 |
| | | | 705/52 |
| 2003/0191719 A1 | 10/2003 | Ginter et al. | |
| 2004/0193441 A1 | 9/2004 | Altieri | |
| 2005/0137015 A1* | 6/2005 | Rogers | A63F 13/12 |
| | | | 463/42 |
| 2005/0193015 A1* | 9/2005 | Logston | G06F 16/44 |
| 2005/0289461 A1 | 12/2005 | Amado et al. | |
| 2007/0250901 A1* | 10/2007 | McIntire | H04N 21/47815 |
| | | | 348/E7.071 |
| 2008/0004093 A1* | 1/2008 | Van Luchene | G07F 17/32 |
| | | | 463/1 |
| 2008/0120196 A1 | 5/2008 | Reed et al. | |
| 2008/0137533 A1 | 6/2008 | Russell et al. | |
| 2008/0228761 A1 | 9/2008 | Leung et al. | |
| 2009/0187657 A1 | 7/2009 | Uemitsu | |
| 2009/0253517 A1 | 10/2009 | Bererton et al. | |
| 2010/0010968 A1* | 1/2010 | Redlich | G06Q 10/00 |
| | | | 707/E17.046 |
| 2011/0145602 A1 | 6/2011 | Ginter et al. | |
| 2011/0245965 A1 | 10/2011 | Farrell | |
| 2012/0047201 A1* | 2/2012 | Jain | H04L 65/65 |
| | | | 709/216 |
| 2012/0210356 A1* | 8/2012 | Kiok | H04N 21/4316 |
| | | | 725/39 |
| 2013/0124311 A1* | 5/2013 | Sivanandan | G06Q 30/02 |
| | | | 705/14.51 |
| 2013/0172068 A1 | 7/2013 | Zhou et al. | |
| 2013/0246643 A1* | 9/2013 | Luby | H04L 65/762 |
| | | | 709/231 |
| 2013/0275755 A1* | 10/2013 | Ignatchenko | H04N 21/4408 |
| | | | 713/168 |
| 2013/0302763 A1* | 11/2013 | Edwards | G09B 1/36 |
| | | | 434/362 |
| 2014/0087355 A1 | 3/2014 | Henry et al. | |
| 2014/0096041 A1 | 4/2014 | Gowen et al. | |
| 2014/0195921 A1 | 7/2014 | Grosz et al. | |
| 2014/0200084 A1 | 7/2014 | Butler et al. | |
| 2014/0200990 A1 | 7/2014 | Caceres | |
| 2014/0201057 A1* | 7/2014 | Shuster | G06Q 40/04 |
| | | | 705/37 |
| 2014/0258101 A1 | 9/2014 | Svendsen et al. | |
| 2014/0298346 A1 | 10/2014 | Zakashansky et al. | |
| 2014/0344015 A1 | 11/2014 | Puértolas-Montañés et al. | |
| 2014/0344656 A1 | 11/2014 | Groom | |
| 2014/0349722 A1* | 11/2014 | Nakatani | A63F 13/828 |
| | | | 463/2 |
| 2015/0026072 A1 | 1/2015 | Zhou et al. | |
| 2015/0039442 A1 | 2/2015 | Sidman | |
| 2015/0073929 A1* | 3/2015 | Psota | G06Q 30/0201 |
| | | | 705/26.2 |
| 2015/0101069 A1* | 4/2015 | Stappenbeck | H04N 21/6581 |
| | | | 726/30 |
| 2015/0164192 A1 | 6/2015 | Gross | |
| 2015/0170112 A1* | 6/2015 | DeCastro | G06Q 20/367 |
| | | | 705/39 |
| 2015/0227890 A1* | 8/2015 | Bednarek | G06Q 10/0833 |
| | | | 705/26.81 |
| 2015/0227940 A1* | 8/2015 | Brunet | G06Q 30/016 |
| | | | 705/304 |
| 2015/0237389 A1* | 8/2015 | Grouf | H04N 21/4882 |
| | | | 725/49 |
| 2015/0245084 A1* | 8/2015 | Downing | G06Q 30/0261 |
| | | | 725/12 |
| 2015/0249872 A1 | 9/2015 | Lee et al. | |
| 2015/0310476 A1* | 10/2015 | Gadwa | G06Q 30/0226 |
| | | | 705/14.27 |
| 2015/0310497 A1* | 10/2015 | Valin | H04L 51/08 |
| | | | 705/14.66 |
| 2015/0314201 A1* | 11/2015 | Wickenkamp | A63F 13/493 |
| | | | 463/31 |
| 2015/0324787 A1 | 11/2015 | Schaffner | |
| 2015/0339020 A1 | 11/2015 | D'Amore et al. | |
| 2015/0356523 A1 | 12/2015 | Madden | |
| 2015/0379579 A1* | 12/2015 | Chiang | G06Q 30/0267 |
| | | | 705/14.64 |
| 2016/0012465 A1 | 1/2016 | Sharp | |
| 2016/0012640 A1 | 1/2016 | Abraham | |
| 2016/0027229 A1 | 1/2016 | Spanos et al. | |
| 2016/0085955 A1 | 3/2016 | Lerner | |
| 2016/0092988 A1 | 3/2016 | Letourneau | |
| 2016/0098723 A1* | 4/2016 | Feeney | G06Q 20/065 |
| | | | 705/75 |
| 2016/0162873 A1 | 6/2016 | Zhou et al. | |
| 2016/0162897 A1* | 6/2016 | Feeney | H04L 9/3236 |
| | | | 705/71 |
| 2016/0217436 A1 | 7/2016 | Brama | |
| 2016/0217532 A1 | 7/2016 | Slavin | |
| 2016/0224949 A1* | 8/2016 | Thomas | G06Q 20/027 |
| 2016/0259937 A1* | 9/2016 | Ford | G06F 21/88 |
| 2016/0260169 A1 | 9/2016 | Arnold et al. | |
| 2016/0283941 A1 | 9/2016 | Andrade | |
| 2016/0321654 A1* | 11/2016 | Lesavich | H04L 67/104 |
| 2016/0321752 A1 | 11/2016 | Tabacco et al. | |
| 2016/0321769 A1 | 11/2016 | McCoy et al. | |
| 2016/0323109 A1* | 11/2016 | McCoy | G06Q 50/184 |
| 2016/0328360 A1 | 11/2016 | Pavlovskaia et al. | |
| 2016/0330027 A1 | 11/2016 | Ebrahimi | |
| 2016/0330034 A1* | 11/2016 | Back | G06Q 20/065 |
| 2016/0335609 A1 | 11/2016 | Jenkins | |
| 2016/0364787 A1 | 12/2016 | Walker et al. | |
| 2016/0379515 A1 | 12/2016 | Okubo et al. | |
| 2017/0011460 A1 | 1/2017 | Molinari et al. | |
| 2017/0083624 A1 | 3/2017 | Scapa | |
| 2017/0099136 A1 | 4/2017 | Straub et al. | |
| 2017/0185981 A1 | 6/2017 | Emmerson | |
| 2017/0244721 A1 | 8/2017 | Kurian et al. | |
| 2017/0244757 A1 | 8/2017 | Castinado et al. | |
| 2017/0272796 A1 | 9/2017 | Hedinsson | |
| 2017/0287593 A1* | 10/2017 | Ovalle | G07F 17/3223 |
| 2017/0337287 A1* | 11/2017 | Gill | G06Q 10/06311 |
| 2017/0372392 A1* | 12/2017 | Metnick | G06Q 30/0613 |
| 2018/0121911 A1 | 5/2018 | Hallam et al. | |
| 2018/0189732 A1 | 7/2018 | Kozloski et al. | |
| 2018/0218027 A1 | 8/2018 | Cronie et al. | |
| 2018/0218455 A1 | 8/2018 | Kolb et al. | |
| 2018/0247302 A1 | 8/2018 | Armstrong et al. | |
| 2018/0285979 A1 | 10/2018 | Chessell et al. | |
| 2018/0374173 A1 | 12/2018 | Chen et al. | |
| 2019/0028278 A1 | 1/2019 | Gilson | |
| 2019/0044700 A1 | 2/2019 | Leddy | |
| 2021/0082044 A1 | 3/2021 | Sliwka et al. | |
| 2022/0035950 A1 | 2/2022 | Wakabayashi | |

* cited by examiner

BLOCKCHAIN GAMING SYSTEM

This application is a continuation application under 35 U.S.C. 120 of U.S. application Ser. No. 16/711,350, filed Dec. 11, 2019, which is a division of application Ser. No. 15/793,600, filed Oct. 25, 2017. The disclosure of the above-identified application is incorporated herein by reference in its entirety for all purposes. This application is also related to the U.S. patent application Ser. No. 15/793,707 filed Oct. 25, 2017.

FIELD

The present application relates to technically inventive, non-routine solutions that are necessarily rooted in computer technology and that produce concrete technical improvements.

BACKGROUND

Computer games and the objects used in the games (such as characters, weapons, etc.) typically are generated by a single authorizing entity.

SUMMARY

As understood herein, a decentralized market for in-game objects that is not controlled by any company can be more trusted by users, making the in-game items more valuable. A system supporting such a market advantageously can be used to support object creation between different platforms that a game is played on, so that, for example, if a user acquires an item in a PC version of a game, the user can transfer the item to a user who is playing a console version of the same game. Such a system may also be used to transfer items or in-game currency between a set of games that has that set of items or in-game currency in common.

In an aspect, an article of manufacture includes at least one computer storage that is not a transitory signal and that in turn includes instructions executable by at least one processor to access a data structure containing information related to non-monetary content, and to access at least a first block chain containing information related to ownership of content represented in the data structure. The instructions are executable to use the information in the block chain and data structure to obtain content represented in the data structure.

In some examples, the instructions can be executable to access a block chain containing information related to publishers of content in the data structure, and to use the information related to publishers of content to obtain content represented in the data structure. Example instructions may be further executable to access a block chain containing information related to retailers of content in the data structure, and to use the information related to retailers of content to obtain content represented in the data structure. Still further, example instructions may be executable to access a block chain containing information related to distribution rights related to content in the data structure, and to use the information related to distribution rights to obtain content represented in the data structure. In some implementations, the block chain containing information related to publishers, the block chain containing information related to retailers, and the block chain containing information related to distribution rights are implemented by a single third block chain. In other implementations, the block chain containing information related to publishers, the block chain containing information related to retailers, and the block chain containing information related to distribution rights are implemented by respective separate third, fourth, and fifth block chains. The data structure representing content may be a block chain such as the first block chain or a second block chain different from the first block chain.

In another aspect, a system includes a processor-executed rule module that includes instructions about how a processor-accessible ownership block chain and a processor-accessible data structure (such as a content block chain) are added to and how the validity of the block chains is verified. The instructions also include a type of content information that can be stored in the content block chain. The system includes the processor-accessible ownership block chain, which includes a chain of ownership blocks having information related to ownership of content in the processor-accessible content block chain. The information related to ownership of content includes information of a type of content indicated in the content block chain that is owned. The system further includes the processor-accessible content block chain with information about the content for which the system can track ownership as reflected in a series of content blocks.

In examples, content ownership indicated in the ownership block chain indicates particular pieces of content. In other examples, content ownership indicated in the ownership block chain indicates units of a particular type of content. In non-limiting embodiments content ownership indicated in the ownership block chain indicates ownership for fractional units of content.

If desired, the instructions in the processor-executed rule module provide a mapping of a new value to a type that it is assigned. The mapping of a new value to a type may be based at least in part on weightings of plural respective types so that statistically over time a number of new values created of a given type is proportional to that type's respective weighting. In some examples, the mapping can be executed at least in part based on a modulo of an identification of a new value and mapping different types to modulo values depending on their respective weightings.

Content represented in the processor-accessible content block chain may include one or more of: video game objects, video games, video content, audio content.

In another aspect, a method includes independently tracking ownership of content using an ownership block chain, independently tracking, using a content data structure such as a content block chain, content related to ownership of content indicated in the ownership block chain, and managing alteration of the block chains using a rule module.

The details of the present application, both as to its structure and operation, can best be understood in reference to the accompanying drawings, in which like reference numerals refer to like parts, and in which:

DETAILED DESCRIPTION

Figure 1:
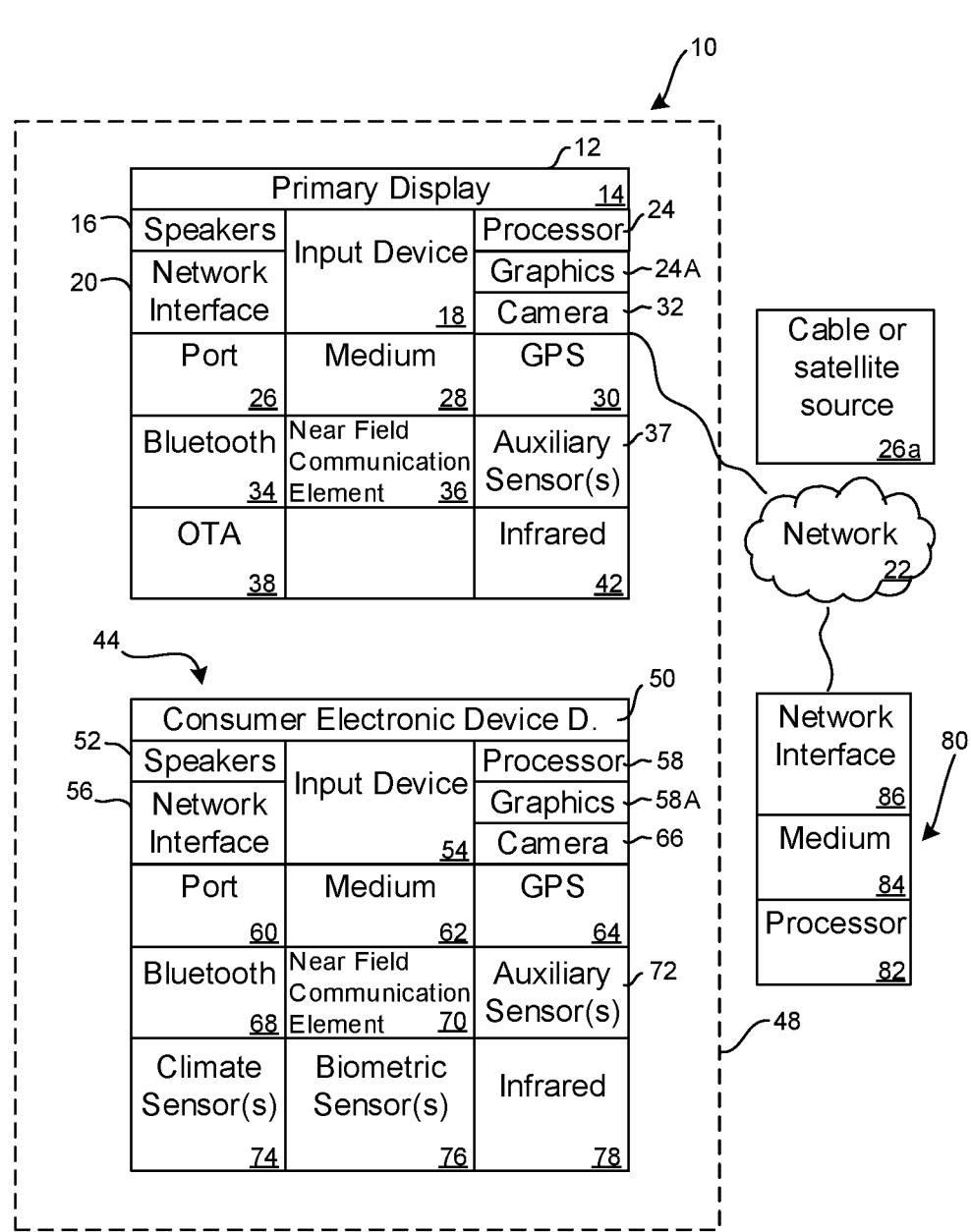
FIG. 1 is a block diagram of an example system consistent with present principles.

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a hard disk drive, CD ROM or Flash drive. The software code instructions may also be downloaded over the Internet.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as a graphics processor 24a for controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content such as computer game software and databases. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Any of the cameras described herein may employ the high spectrum camera example or multiple examples described further below.

Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element. Zigbee also may be used.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device such as the source 26a may include similar components as the first CE device 44. In the example shown, CE device may be configured as a VR headset worn by a player or a hand-held game controller manipulated by the player. In the example shown, fewer or greater devices may be used.

In the example shown, to illustrate present principles the devices are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

A CE device may include some or all of the components shown for the CE device 44. CE devices may be powered by one or more batteries.

Now in reference to the afore-mentioned at least one server 80, it includes at least one server processor 82, at least one tangible computer readable storage medium 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

Figure 2:
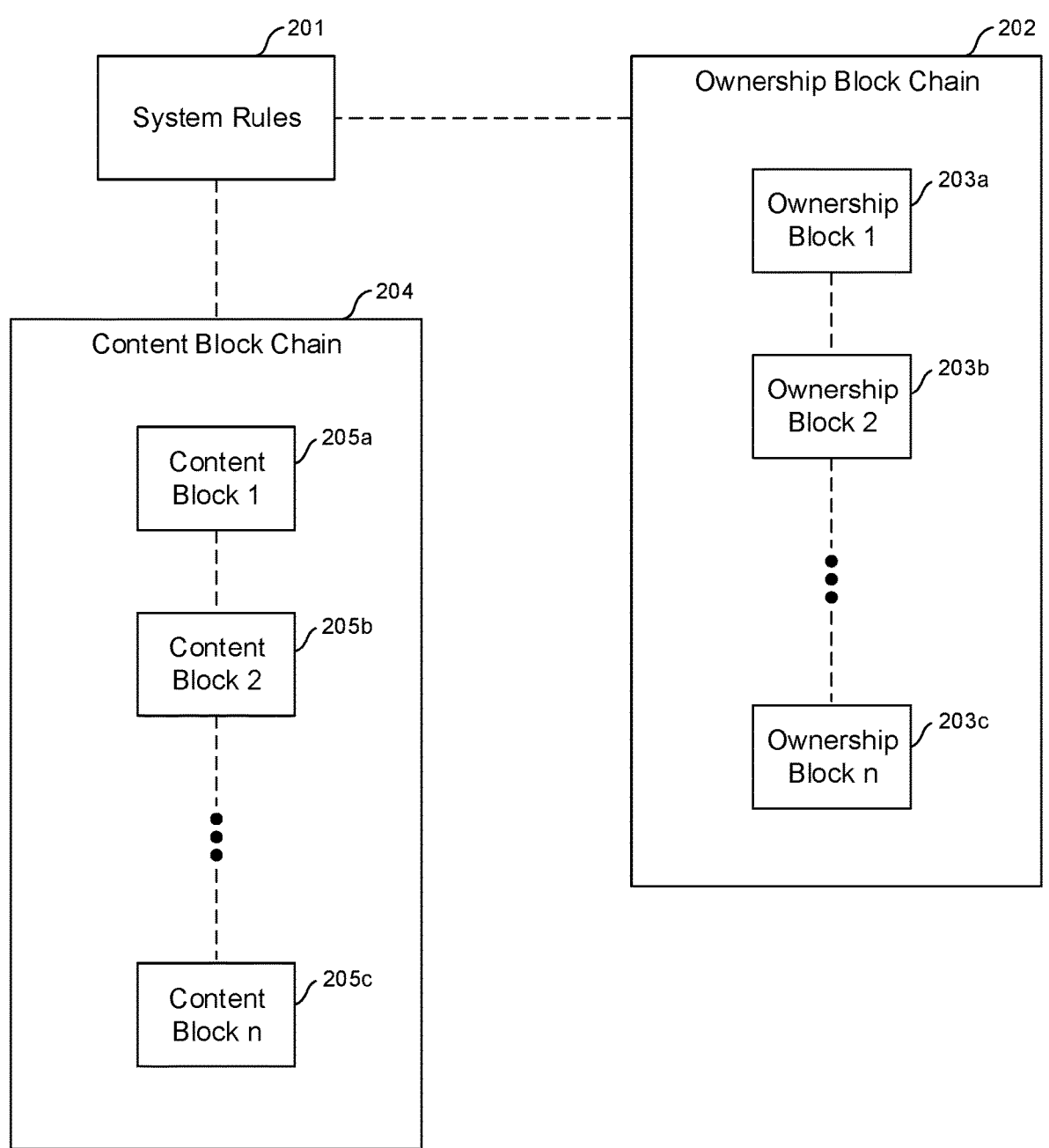
FIG. 2 is a block diagram of a system used to track user ownership of content.

FIG. 2 shows a block diagram of a system used to track user ownership of content. The modules/logic represented in FIG. 2 may be implemented by compilers that receive source code instructions and convert the source code to machine-readable code to execute the instructions. System rules 201 include instructions about how an ownership block chain 202 and a content block chain 204 are added to and how the validity of the block chains is verified. The instructions also govern the type of content information that can be stored in the content block chain and how that content information is interpreted. In addition, the instructions govern how a consensus is reached for what content information should be added to the content block chain.

The ownership block chain 202 tracks the user ownership of content. The ownership block chain 202 is comprised of a chain of ownership blocks 203. Each ownership block 203 can contain a collection of records of user ownership of content, including transfer from one owner to another. Each ownership block 203 can be linked to the chain of blocks before by the inclusion of cryptographic hashes based on the previous blocks. Each ownership block may be cryptographically signed to allow the validity to be verified. Once an ownership block is included in the block chain it cannot be modified. The ownership information in the block can be overwritten by information in blocks that are added later indicating that the ownership of a piece of content transferred from one owner to another owner. One advantage of such a system is that it can allow for in-game content that can be transferred between users independently of any game system, publisher, or platform. Each ownership block 203 may also include new content ownership as allowed by system rules 201, such as through mining or maintenance of the block chain.

A significant difference between the ownership block chain 202 and the block chains used for tracking crypto currencies is that the ownership tracked in the ownership block chain is not just an indication of a quantity that is owned, but is an indication of the type of content that is owned. In some implementations, the content ownership is for a particular piece of content, in which case the ownership can be a single atomic unit. In some implementations, the content ownership is for a unit of a particular type of content. In some implementations, the content ownership can be for a quantity, including fractional units, of a particular type of content.

The content block chain 204 can include information about the content for which the system can track ownership. The content block chain 204 includes a series of content blocks 205 that are organized into a block chain similar to how the ownership blocks 203 are organized into a block chain.

There are separate rules in the system rules 201 for how content is added to the ownership block chain and how content is added to the content block chain. As contemplated herein, the rules mentioned above provide a deterministic mapping of a new value to the type that it is assigned so that all participants in the block chain can verify the assignment of the new value to a type. In an alternate implementation, the owner of the new value has certain choices in what that value can be. When the owner registers the new value the user also registers any choices made in determining what the characteristics or type that the new value will have.

Furthermore, the mapping of a new value to a type can be based on weightings of the types so that statistically over time the number of new values created of a given type will be proportional to that type's weighting. Such a mapping can be done by taking a modulo of an ID of the new value and having different types map to larger or smaller ranges of the possible modulo values depending on their weightings. This may be used, for example, a collectable trading card game for having some cards be more common than others, such as games that have common, uncommon, and rare cards. Any unique values can be populated in the initial blocks.

In some implementations, all object creation may be done by the company that controls the game and the initial allocation is done by the game company as people complete certain achievements in the game or spend currency, either in-game or real world, to purchase the items. Or, mining for new objects can be done by the game when users in the game perform certain actions, such as opening a chest. The set of items that a newly found item can be might be completely deterministic. The set of items that a newly found item can be might be based on a characteristic of the game character, such as the class, race, quest, inventory, wish list, or level of a character. It may also be determined by other elements of the game world, such as difficulty setting, portions of the map that have been discovered or explored, any unlocks that have been achieved, or achievements of the player, such as trophies earned. Such a mechanism can be used to ensure that the item is useful to the character and is in balance with the current game play. In some implementations, the ownership granted to the user may be recorded with unresolved choices to be made and those choices may be recorded later. Such an implementation has the advantage that ownership of a newly mined unit may be recorded at the time the mining happens even if the user is not available to make any allowed choices at that time.

In some implementations content in the list of available content can be associated with an originator who may grant new content of that type to users. In some implementations, some content can be granted by an originator while other content cannot be granted by an originator. Users granted content by an originator own the content and can transfer that ownership without involvement from the content originator that they received the content from. One use of such an implementation would be to allow a game publisher to create new content that can be used in one or more of its games and control the initial allocation of that content to users, which will allow them to control the quantity of that content that exists. Another use would be for a game retailer to be able to reward its customers with new instances of the content, such as in a promotion rewarding the customer for buying a game from the retailer in which the content can be used. In some implementations, this right to issue new content ownership may be limited to a particular quantity that can be issued, such as having a limited edition of 1000 swords that can be granted. A similar effect can be achieved by granting ownership of new content in the ownership block chain to a user at the time that the content is added to the system, which, for example, can be used to grant ownership of 1000 new swords to a game retailer when the content information for the new sword is added to the system, allowing the game retailer to transfer the ownership of each new sword to users as it sees fit.

Yet again, the set of items that a newly found item can be might depend on choices that the player is allowed to make at the time that the item is found. The mining can be done on an ongoing basis as the game runs, such as to take advantage of otherwise unused processing cycles. Such mining can be in the form of performing work to add new blocks to the chain.

Still further, mining can be performed independently of the game. The newly found values may still be deterministic or may allow choices to determine what they become when they are registered.

Contemplated herein is that the objects represented in the block chain may be other than in-game content, such as games, video content, and/or music content. A first service can be set up to examine a block chain to determine what other second services a user is subscribed to and what content those subscriptions currently proved the user rights to access. The first service can then provide access to the content to the user based on the user's right to access the content through the second service even though the user would not otherwise have the right to access the content directly through the first service. Such a system can be used to set up independent secondary market places for the transfer of content that is not governed by a particular company or platform. Such a system would lead to much more portable content rights on the part of users, and would not be vulnerable to a single point of failure or even intentional disruption on the part of any company. One of the major disadvantages with current content purchase systems is that they are all tied to a platform and/or company. Users are therefore reluctant to spend money to purchase content in such existing content management systems as their right to the content is only worth anything as long as the ones who control the system continue to support the system. Present principles eliminate such disadvantages, encouraging consumers to migrate their content purchases to digital format.

Accordingly, in some implementations the content information identifies content that is maintained outside of the system, such as identifiers to content in a CDN or video game. In other implementations, the content information contains the full information about a piece of content that users can own. This information can include game rules for the content, artwork, and statistics such as power, defense, cost, and/or rarity.

In some implementations, the system is used to track a user's ownership of game assets. In some of these implementations the full game is tracked by the system, while in other implementations the system tracks the ownership of game assets that can be used within one or more games that exist outside of the system.

In some implementations, the content information added in a block can contain errata that changes the definition of content that was previously added, such as to correct a typo, adjust the rules to cover a corner case that was initially missed, or adjust the statistics to make the game more balanced. In some implementations, the content information added in a block can depreciate or remove existing content, in such a case users that own the content being removed may be compensated. This compensation can come in the form of exchanging their ownership of the removed content with ownership of one or more other types of content, which in some cases can include content added in the same block that removed the existing content. An example of a system that tracks game assets that can be used within a game that exists outside of the system is a system that provides the user with costumes that can be worn by a user's character in a game that the user can play without using the system if he does not wish to have his character wear the costume. An example of a game where the full game is tracked by the system is a tradable playing card game where the only cards available to each player are the ones tracked by the system and the game is only playable by using the game units tracked by the system. A hybrid implementation can exist where a trading card game may give the user full use of all cards in the base set, allowing the game to be played without the system, but all of the expansion cards are only usable by users who have ownership rights to those cards within the system.

In some implementations, the content that is added can be a set of content that is added at one time. This can be used to add an expansion set to a game. In some implementations, such an addition can be done in the form of a single block, which can be of a variable size to accommodate different sized sets of content. In other implementations fixed sized blocks are used, in which case a large expansion would need to be added in multiple blocks. The multiple blocks can be added to the block chain as a single atomic action to ensure that the whole set is available at the same time. In some implementations additions or modifications to the game rules, or new game mechanics can be added to the content information. Such information would not be a description of a unit that can be owned in the ownership block chain. In some implementations, this game rule information may contain new rules that are referenced by content information about units that can be owned, such as the addition of a new ability that a game unit may possess.

In some implementations users can vote on whether or not to include an expansion set in the game system. If a consensus of users' votes to include an expansion set, then the set is added to the system. In some implementations users may vote on what content is included in a pending expansion set. This not only allows users to vote on what is in an expansion set, but allows a consensus on what sets of content are included together. This also allows users to play test potential expansion sets so that game balance problems can be worked out before the expansion set is added to the system. In some implementations, a potential expansion set can be made available to play in a beta format. In some implementations, each user gets a single vote, while in some implementations users may have weighted votes based on factors such as quantity of content owned or amount of time spent playing. In some implementations, users are rewarded with votes on future content and/or expansion sets when they complete specific tasks or achieve certain milestones in one or more games.

In some implementations, separate sets of block chains are used for tracking the ownership of each expansion and what content is in each expansion. Such an implementation has the advantage that the set of data is segregated so that only data about sets currently being used needs to be examined to determine ownership. Such an implementation has the disadvantage that any trades of units between sets requires updates to separate block chains and would be more difficult to achieve in an atomic manner.

When an expansion set is added to a game, then players playing the game can agree to which expansion sets are allowed to be used in that game, and even decide if base set content is allowed to be used in the game. In some implementations, there can be standard game types, such as unlimited that allow all content or a standard game type that only allows the base set and the two most recent additions.

In some implementations when a user is granted a new entitlement the user can be given a choice of which expansion, or the base set, that she wants the content to come from. In some implementations, this choice is dependent on preferences that the user sets before the entitlement is granted. This has the advantage that no user input is needed at the time the entitlement is granted and there is no delay between when the entitlement is granted and when it is registered in the ownership block chain. In some implementations game units for new entitlements are distributed across all available units. In some implementations game units for new entitlements are more likely to come from more recent or more popular expansions. In some implementations game units for new entitlements come from a particular expansion set. Such new entitlement grants may come from mining, game play, rewards for content creation, or any other activity that results in new entitlement creation.

In some implementations, there can be rules to allow users to exchange content that they own for other available content. For example, a user could be granted the ability to trade a common card from expansion set 1 for a common card in expansion set 3 if he wanted to play with the more recent expansion set. In another example, a player could trade a rare card for two common cards. Other restrictions can be placed on trades, such as only for cards of the same type, color, and/or cost. In some implementations only trades from a whitelist of allowable trades can be made.

In some implementations, some content ownership can give the user an option on which type of content she wishes to have it be when it is used. For example, in a card game implementation the user may have an entitlement to a placeholder card that the user can select any common resource generation card to use for the placeholder when using that placeholder in a game. In some implementations, the choice would have to be made when the game starts. In some implementations, the choice of which card to use for the placeholder may change within the game play based on what is allowed by the game. In some implementations, the placeholder is implemented as a special type of entitlement that enumerates the possibilities. In some implementations, once the user chooses what type of unit a placeholder should be the user gains ownership of that type of unit and loses any ownership they had for the placeholder. In such an implementation, once the choice for what a placeholder should be is determined it cannot be later changed.

In other implementations, the placeholder is implemented as a type of content that enumerates the other types of content. In some implementations, the result of mining can give the user raw materials and the game can allow the user to craft items they want from those raw materials. In such an implementation, the game would then add a transaction to the ownership block chain removing the ownership of the raw materials and adding ownership of the item or items that were crafted.

In some implementations, a user may use content from multiple block chain accounts within the same game play by providing the keys to each of those accounts. In some implementations, a game communicates with a central server that ensures that the same block chain account is not being used by more than one game player at the same time. In some implementations one or more block chain accounts can be associated with a game account so that when a user plays with that game account content that is owned in an associated block chain account can automatically be available in games. In some cases, the game account is used across more than one game, such as an account with a game console provider.

In some implementations content owned by the user in the system can be usable in more than one game. For example, a user might own a top-hat in the system and there can be several games that allow the use of content owned in the system and understand the top hat content to be able to allow the user's character in the game to wear the top hat.

In some implementations, the system can track user behavior in addition to ownership, such as time spent playing, or number of times each content is used by a user. This can give the advantage that active players can be rewarded with prestige or other compensation. In some implementations, no record of activity using the content from the system is generated as the content is used.

In some implementations, the system is used for tracking of user rights to entitlements. In such a case, the ownership block chain tracks the rights that a user has to pieces of media or other assets, such as songs, albums, movies, TV shows, TV series, TV channels, media subscriptions, electronic books, or video games. In most cases these assets will be protected by some form of DRM to allow access only to users that can demonstrate that they have rights, such as having their rights to the asset included in the ownership block chain. In some systems used for tracking entitlements a standard set of encodings are included in the content block chain, so that the particular entitlement indicated by that encoding can be recognized and fulfilled by a plurality of providers based on the user's right to the entitlement in the ownership block chain.

In some implementations, the entitlements tracked by the system may give the user rights to something physical, such as books, clothing, or tickets to an event, instead of just electronic entitlements. In such an implementation, the block chain would be amended to remove the user's right to the entitlement when he exchanges his right for a physical good or entry into a physical event.

In some implementations, the content block chain 204 is not implemented as a block chain and instead is a static set of content information. In such an implementation, a separate ownership block chain 202 can be created when ownership of a new set of content information is to be tracked. The new block chain can be governed by the same set of system rules, but using a different set of content information. In some implementations, the users of the system can switch to using a new version of the system, which has the same ownership block chain, but has an updated set of content information.

Updating content information in an implementation that does not use a block chain implementation may be more difficult as a block chain implementation is designed for information to be appended. In some implementations, the content information can be completely replaced with a new set of content information, in which case a hash of the new content information may be added to the ownership block chain 202 to allow the change to be validated. Such an update needs to be done carefully to ensure that all of the existing content references in the ownership block chain 202 are still valid after the update.

New ownership in rights in the block chain 202 can be created through mining. Mining can be in the form of work done to maintain the block chains, including adding new blocks and verifying content. Mining can also be done in the form of work to solve complex cryptographic equations.

In some instances, mining can be limited to processing done by a game console. Such an implementation has the advantage that the computing power available for each user to dedicate to mining is limited, eliminating users that have a significant advantage in mining by spending a lot of money to buy computing power that they use for mining. In some implementations, mining happens in certain points during game play, such as when a character opens a chest in the game. Such mining may be limited to a providing a limited set of items. The game should be implemented such that it can sign the content entitlements that it grants through such a mechanism to ensure that users can not add the entitlements outside of game play. The key that the game uses for signing the entitlements it grants needs to be protected, such as by only doing the signing on game system servers and not sending the key to the client. In such an implementation, the definition of the content that can be granted by a game system should contain a signature that can be used to verify that entitlements for that content are properly signed. In some implementations, the game performs mining operations with spare computing power while the user is playing the game and when the mining generates an object the game may present the object to the user in-game, such as by spawning a chest containing the object. Such a system can have the advantage that it can receive near real time feedback about choices for the object from the user as the object is found so that the object ownership can be registered with these choices. Such a system also has the advantage that it can be a way to reward user for the time they sped playing the game.

In some implementations mining for difficult blocks can be rewarded more than mining for easy blocks when that mining finds a new block. For example, mining the easiest blocks may yield only common game units, while mining difficult blocks may yield rare game units or multiple common game units. In some implementations mining a difficult block may provide a set of units, such as one of each unit in a particular expansion set.

In some implementations, successful mining can reward users with points. Users can then exchange these points for the game units they want. This is similar to awarding placeholder units except that there can be many different types of placeholder units, with each type of placeholder unit having different rules for what it can be exchanged for. In some implementations mining difficult blocks rewards more points than mining easy blocks.

In some implementations, the system can be designed to allow game units to be put at risk or expended as part of game play. In such an implementation, the user should need to provide the game with a cryptographic key specific to each unit being risked so that if the game creates a transaction where the ownership is destroyed or transferred there can be verification that the transaction was authorized. Such a system would allow users to ante up units as stakes in a game where the winner gets to keep all of the units that were anteed. Such an implementation can enable high stakes games where if a unit gets killed or destroyed in the game then the user loses ownership of that unit. In most cases such a high stakes game would also provide opportunities for users to acquire new units through game play so that there is also a potential ownership up side of playing for the user. In some implementations ownership rights lost by a player will be completely removed from the system. In some implementations, new ownership rights granted to a user by a game are ownership rights that did not exist previously. In some implementations ownership rights lost by a player get transferred to the game system and the game system may transfer ownership of those units to players that earn then through game play. In some implementations units are transferred directly from one player to another player through the game based on game play.

Figure 3:
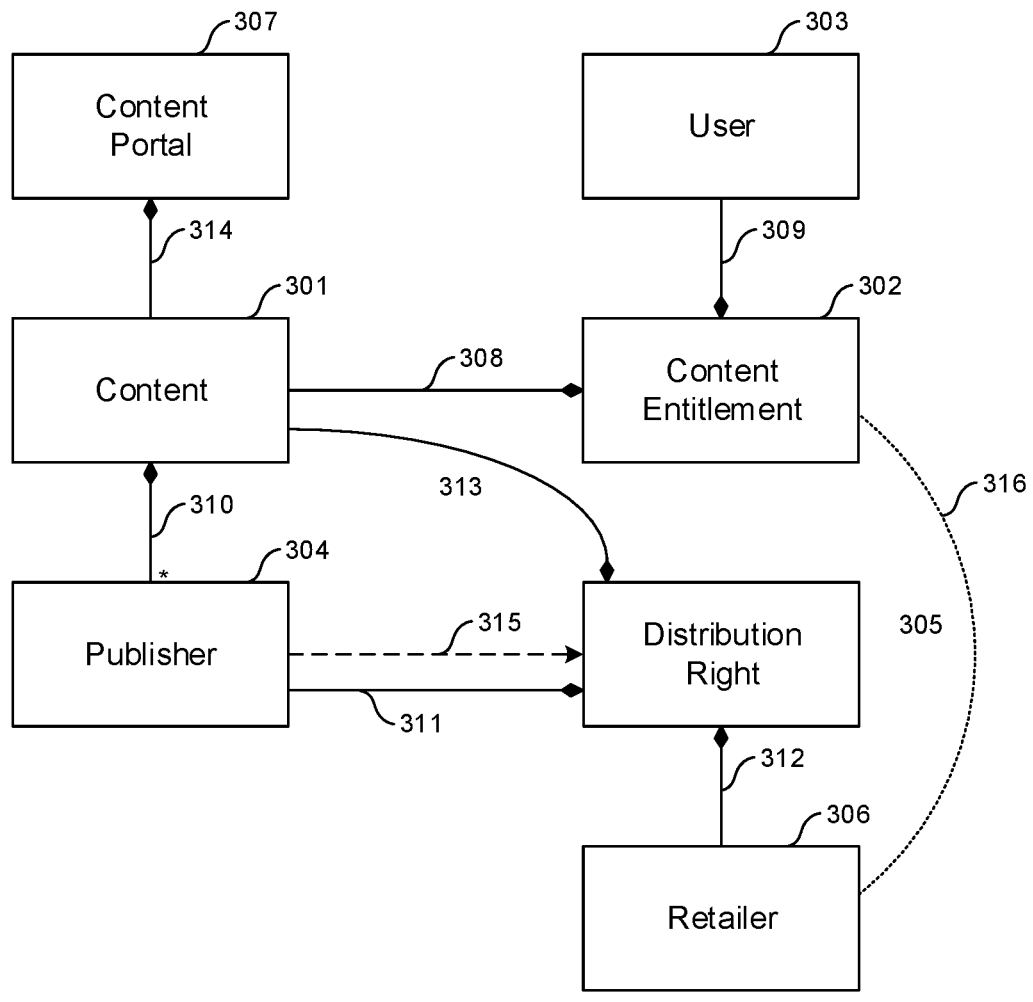
FIG. 3 is a system diagram of the entities involved in one implementation of the system in which the system is used to independently track ownership of content rights.

FIG. 3 shows a system diagram of the entities involved in one implementation of the system in which the system is used to independently track ownership of content rights. In such a system, a set of content entitlements 302 is tracked in a block chain, such as the block chain 202 in FIG. 2. The block chain allows transfers of content entitlement ownership from one user to another independently of any particular third party, such as the content owner, the entity that originally sold the entitlement to the content, or any of the entities that can provide the content to the user to allow the user to consume the content.

Content 301 corresponds to one of the choices described in the content block chain 204. In the case of content that consists of large media, generally the content block chain 204 will only provide information about the content and will not contain the full body of the content. Each content entitlement 302 will be a record of ownership of the rights to one piece of content 301 through relationship 308. In some alternate implementations, a content entitlement 302 can provide ownership rights to more than one piece of content 301.

Each content entitlement 302 will provide the ownership right to one user 303 through relationship 309. A content entitlement 302 that is later added to the ownership block chain 202 can specify a second user for the same entitlement, in which case the ownership granted by the content entitlement 302 to the first user is no longer considered valid as it has been replaced by the new content entitlement 302.

In some implementations, each piece of content 301 has an associated publisher 304 who owns the rights to that piece of content as shown in relationship 310. The relationship can be stored in the content information about the content in the content block chain 204.

A publisher 304 can grant distribution rights 305 to the content that it owns to retailers 306 that allow those retailers to sell ownership of rights to the content to users 303. Relationship 315 shows the creation of distribution rights 305 by a publisher 304. Relationship 312 shows the relationship that each distribution right 305 is granted to a single retailer 306. In some implementations, a distribution right 305 may grant the rights to sell all content owned by a publisher 304, as shown by relationship 311. In some implementations, a distribution right 305 may grant the rights to sell a particular piece of content 301 owned by a publisher 304, as shown by relationship 313. The system can support both relationships 311 and 313, or it may just support one of them. In some implementations, the choice of which relationship 311 or 313 that publisher 304 grants can be a business decision on the part of publisher 304.

When the user 303 seeks to consume the content 301 that he or she is granted a right to through a content entitlement 302, content is delivered to the user from a content portal 307. The content portal may verify the user's right to consume the content before distributing the content to the user. In some implementations, the content portal employs Digital Rights Management (DRM) to prevent the user from directly accessing the raw form of the content, such as through a device that will play the content for the user but not allow the user to access the source of the content. Typically, a content portal 307 may use a Content Distribution Network (CDN) to provide sizable media content to users, such as video files like movies or TV shows, or video games.

Relationship 314 represents the set of content 301 that is provided by a content portal 307. In some implementations, this relationship is stored in the system, which has the advantage that users can know where to access the content that they own. In other implementations, a user can have a relationship with a content portal 307, and the content portal 303 can tell by examining the ownership block chain 202 what content 301 that the content entitlements 302 owned by the user grant the user rights to. The content portal can then provide any of the content 301 that the user 303 has rights to for consumption by the user 303 regardless of what retailer 306 those rights wire initially obtained through.

A retailer 306 may also be a content portal 307, in which case the set of content 301 that entity can sell as a retailer may or may not be the same set of content 301 that that entity can provide as a content portal 307.

Figure 4:
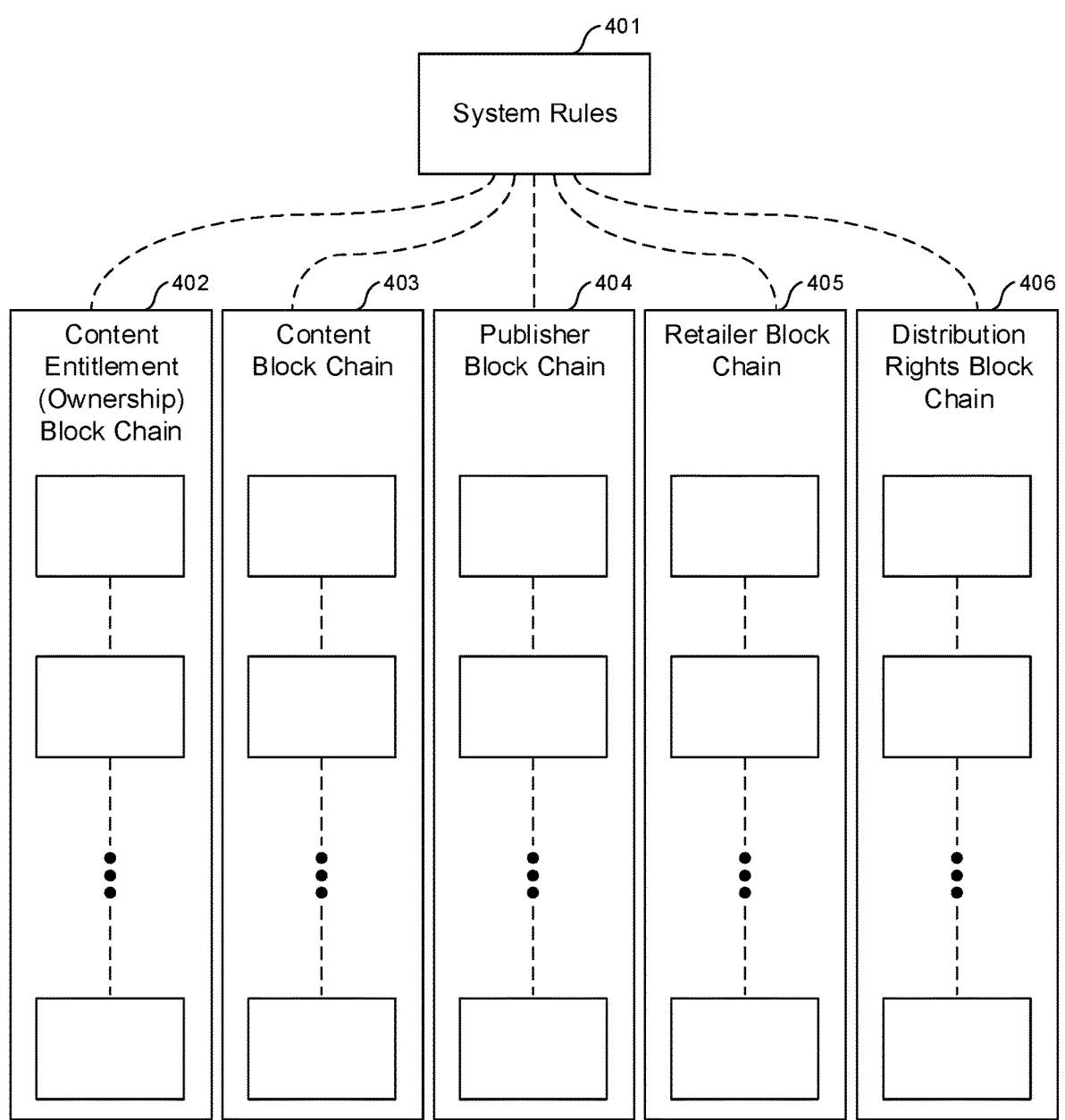
FIG. 4 is a system diagram of one implementation of a system that can be used for the system implementation in FIG. 3.

FIG. 4 shows a system diagram of one implementation of a system that can be used for the system implementation in FIG. 3. In the implementation in FIG. 4 separate block chains are used for tracking each of the content entitlements (ownership) 402, content information 403, publishers 404, retailers 405, and distribution rights 406. The system rules 401 contain information on how each of these block chains are added to and verified along with information on how the information in each of these block chains is used.

In some implementations, some of the information that is shown stored in separate block chains may be combined and stored together in the blocks of a shared chain. For example, the publisher, retailer, and distribution rights could be stored in the same block chain. In another implementation, the content entitlement block chain 402 can remain as a separate block chain while the other block chains 403, 404, 405, and 406 can be combined into a single block chain.

In some implementations, the set of content that a content portal can provide is also stored in the system, which is not shown in FIG. 4. That information can be stored in its own block chain or can be combined with the information in another block chain.

It may now be appreciated that an example use case for a block chain gaming system is to implement a collectable unit game such as a collectable trading card game backed by a block chain that tracks which units each player currently owns or controls. Such a game system would be able to allow users to collect game units independently of any company or game platform. In some implementations, the block chain is tied to a particular company and/or a particular platform. Secondary markets can be set up for the exchange of game units. Transfers of units can be tied to other exchanges outside of the game, such as a monetary payment. In some instances, the rules governing the game play are formalized and included with the block chain and the rules governing the block chain so that the game is self-contained. This would also allow the game rules to be automatically enforced. In some instances, additional content can be added to the possible values as the block progresses. In some of these instances the content is added in sets, such as an expansion pack. In some cases, users decide which expansion packs are allowed in their game when starting a game. When a game is played the game evaluates the block chain ledger to determine what units each player who will participate in the game owns at the time.

In some implementations, all data may be stored together in a single block chain.

It will be appreciated that whilst present principals have been described with reference to some example embodiments, these are not intended to be limiting, and that various alternative arrangements may be used to implement the subject matter claimed herein.

What is claimed is:

1. An apparatus, comprising:
   one or more processors configured with instructions to:
      execute at least one rule module comprising instructions about managing at least one processor-accessible ownership block chain and at least one processor-accessible content data structure, each ownership block of the processor-accessible ownership block chain comprising information related to ownership of content in the processor-accessible content data structure;

determine a game play event occurring in a computer game;

cause a mining process for an additional ownership block to be added to the processor-accessible ownership block chain based on determining the game play event;

determine the additional ownership block is of a first type rather than a second type; and reward mining of the additional ownership block based on the additional ownership block being of the first type rather than the second type.

2. The apparatus of claim 1, wherein a first content in the processor-accessible content data structure comprises the computer game and an associated publisher controlling initial allocation of the first content to gamers.

3. The apparatus of claim 1, wherein the one or more processors are further configured with instructions to:

establish, for at least one newly mined content, a type from a set of types based at least in part on choices input to a computer game by a player at a time that the newly mined content is mined.

4. The apparatus of claim 1, wherein content in the processor-accessible content data structure comprises computer game content, video content, and music content.

5. The apparatus of claim 4, wherein content information in the processor-accessible content data structure comprises game rules for content, artwork, and statistics comprising rarity.

6. The apparatus of claim 1, wherein the processor-accessible content data structure comprises at least one block chain.

7. The apparatus of claim 1, wherein the one or more processors are configured with instructions to deny storage, in the processor-accessible content data structure, of content of a type that is not one of a set of types of content that can be stored in the processor-accessible content data structure.

8. The apparatus of claim 1, wherein the one or more processors are further configured with instructions to:

receive votes on whether to include at least one expansion set in a computer game system; and responsive to the votes, add the at least one expansion set to the processor-accessible content data structure.

9. The apparatus of claim 8, wherein a first vote of the votes comprises a first weight and a second vote of the votes comprises a second weight different from the first weight.

10. The apparatus of claim 8, comprising a first block chain tracking ownership of a first expansion set and a second block chain tracking ownership of a second expansion set.

11. The apparatus of claim 1, wherein the rule module comprises rules to allow an exchange of content for other available content.

12. The apparatus of claim 1, wherein the one or more processors are further configured with instructions to:

permit access to content from multiple block chain accounts associated with the computer game according to keys to each respective account.

13. The apparatus of claim 1, wherein the one or more processors are further configured with instructions to:

track, using the processor-accessible ownership block chain, user behavior in addition to ownership.

14. The apparatus of claim 1, wherein the one or more processors are further configured with instructions to:

track, using the processor-accessible ownership block chain, user rights to entitlements of assets in the processor-accessible content data structure.

15. The apparatus of claim 1, wherein the processor-accessible content data structure is implemented as a static set of content information.

16. The apparatus of claim 1, wherein the one or more processors are further configured with instructions to:

create new ownership in the processor-accessible ownership block chain through mining.

17. An apparatus, comprising:

one or more processors configured with instructions to:

manage at least one processor-accessible ownership block chain and at least one processor-accessible content data structure, the processor-accessible ownership block chain comprising a chain of ownership blocks comprising information related to ownership of content in the processor-accessible content data structure, the processor-accessible content data structure comprising information about the content for which the apparatus can track ownership; and reward mining for blocks of a first type more than mining for blocks of a second type.

18. The apparatus of claim 1, wherein the one or more processors are further configured with instructions to:

responsive to a computer game creating a transaction where ownership indicated in the processor-accessible ownership block chain is destroyed or transferred, verify that the transaction is authorized.

19. An apparatus, comprising:

one or more processors configured with instructions to:

execute at least one rule module comprising instructions about managing at least one processor-accessible ownership block chain and at least one processor-accessible content data structure, the processor-accessible ownership block chain comprising a chain of ownership blocks, each ownership block of the ownership block chain comprising information related to ownership of content in the processor-accessible content data structure, the processor-accessible content data structure comprising information about the content for which the apparatus can track ownership;

the rule module defining types of content information that can be stored in the processor-accessible content data structure according to input indicating content type from content owners represented in the processor-accessible ownership block chain and associated with respective content in the processor-accessible content data structure; and the one or more processors being further configured with instructions to manage the ownership block chain and content data structure according to the rule module;

grant an entitlement; and responsive to the grant, provide a choice of which expansion set or base set of a computer game that content is to come from based on a preference set before the entitlement is granted.

* * * * *